Figure 1:
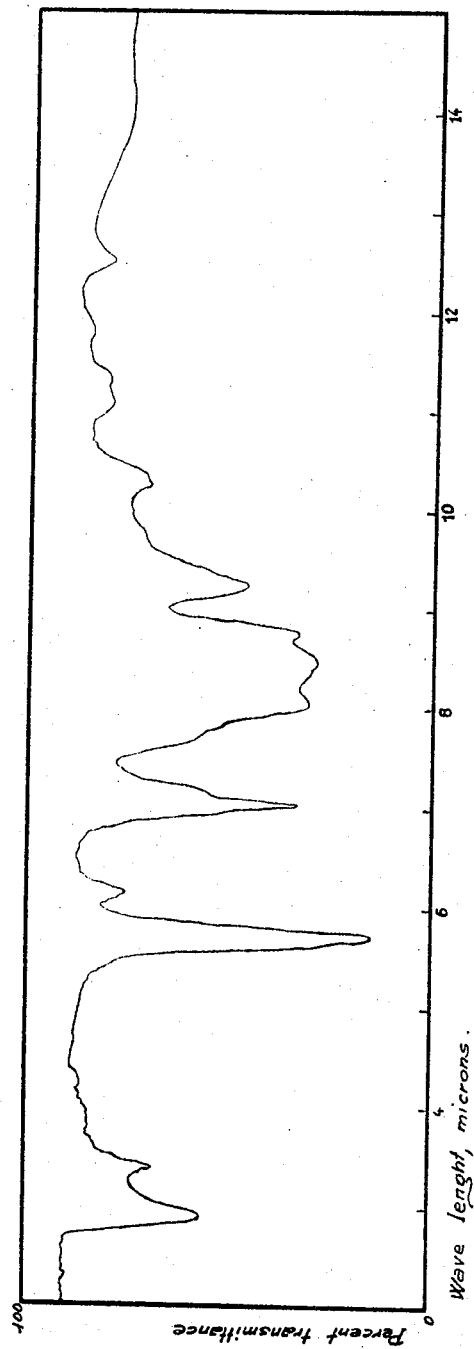

United States Patent
Cevidalli et al.

[15] 3,673,156
[45] June 27, 1972

[54] COPOLYMERS OF CARBON MONOXIDE WITH CARBONYL COMPOUNDS AND PROCESS FOR THEIR PREPARATION

[72] Inventors: Guidobaldo Cevidalli; Mario Ragazzini, both of Milan; Mario Modena, Bollate, Milan, all of Italy

[73] Assignee: Edison, Milan, Italy

[22] Filed: June 5, 1967

[21] Appl. No.: 645,543

Related U.S. Application Data

[63] Continuation of Ser. No. 272,073, April 10, 1963, abandoned.

[30] Foreign Application Priority Data

April 11, 1962  Italy..........................................7149/62

[52] U.S. Cl..................260/67 FP, 260/30.4 R, 260/32.8 R, 260/33.2 R, 260/33.4 R, 260/63 CQ, 260/63 HA, 260/67 A, 260/67 UA, 260/535 R
[51] Int. Cl. .........................................C08g 1/02, C08g 1/04
[58] Field of Search............260/533 A, 535, 484, 67, 63 CQ

[56] References Cited

UNITED STATES PATENTS

| | | | |
|---|---|---|---|
| 2,152,852 | 4/1939 | Loder | 260/535 |
| 2,153,064 | 4/1939 | Larson | 260/530 |
| 2,331,094 | 10/1943 | Loder | 260/484 |
| 2,371,990 | 3/1945 | Hanford | 260/67 |
| 2,989,506 | 6/1961 | Hudgin et al. | 260/67 |
| 2,989,511 | 6/1961 | Schnizer | 260/67 |

Primary Examiner—Harold D. Anderson
Assistant Examiner—L. M. Phynes
Attorney—Karl F. Ross

[57] ABSTRACT

Copolymers of carbon monoxide with carbonylic compounds having all of the groups

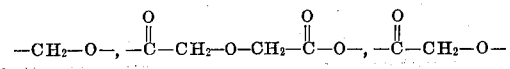

and a process for making these copolymers which involves reacting under anhydrous conditions, carbon monoxide and formaldehyde monomer, linear polymers thereof or trioxane in the presence of a catalyst selected from the group of cationic chlorinated and fluorinated derivatives of an element selected from the groups III, IV, V and VIII of the Periodic Table, at a temperature between about −110° C and +250° C under a pressure of about 30 to 5,000 atm. to produce a polymer consisting essentially of all of the structural units:

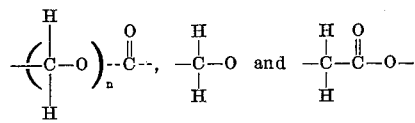

in a random distribution and as represented by the formula:

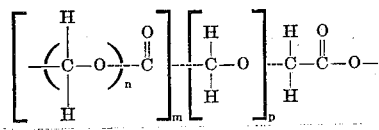

wherein $n$, $m$ and $p$ are whole numbers $>0$.

10 Claims, 4 Drawing Figures

I.R. Spectrum of a copolymer of carbon monoxide and formaldehyde having an analysis of 41% C. and 4.4% H and an "r" value = 0.72.

I.R. Spectrum of a copolymer of carbon monoxide and formaldehyde having an analysis of 41% C. and 4.4% H and an "r" value = 0.72.

I.R. Spectrum of a copolymer carbon monoxide and formaldehyde having an "r" value of about 0.1.

Inventor

William W. Stokes

COPOLYMERS OF CARBON MONOXIDE WITH CARBONYL COMPOUNDS AND PROCESS FOR THEIR PREPARATION

This application is a streamline continuation of the now abandoned application Ser. No. 272,073, filed Apr. 10, 1963.

The present invention relates to a new class of copolymers having both acetal and oxy-ester bonds. More precisely, it relates to a new and useful class of copolymeric compounds of carbon monoxide and an organic compound containing a carbonyl group, and to the method of preparation of these copolymers.

Homopolymers of carbonyl compounds are known, particularly those of formaldehyde; likewise known are copolymers of formaldehyde with monomers containing vinylically unsaturated bonds, with cyclic esters and with lactones. Moreover, copolymers of carbon monoxide with ethylene or with other monomers containing ethylene-type unsaturated bonds, such as acrylonitrile, vinyl acetate, acetylene, butadiene, etc. are also known.

However, by contrast, until the present invention, copolymers of carbon monoxide and carbonyl compounds and methods of preparing these copolymers have not been known.

It is an important purpose of the present invention therefore to provide new compounds which because of their mechanical and chemicophysical properties are valuable chemical intermediates.

Another purpose is to provide new polymeric products having relatively low molecular weights which are particularly valuable, for example, in the manufacture of paints and adhesive compositions.

Still another purpose of the present invention is to provide new high-molecular-weight copolymeric plastics which are extremely useful in the field of synthetic materials.

Another purpose is to provide new chemical products having a high degree of crystallinity, which permit their application in those areas of science where such valuable physical properties are highly desired, for example, fibers, films, etc.

Another purpose of the present invention is the provision of a method of preparing the novel copolymers of this invention.

These and other advantages will become clearly apparent hereinafter.

In accordance with the invention a new class of copolymers are provided which are characterized by the presence of the following, schematically illustrated, structural units:

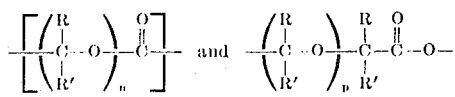

wherein $n$, and $p$ represent integers greater than zero and R and R' are selected from the group consisting of hydrogen; fluorine; chlorine; bromine; iodine; straight and branched chain haloalkyl groups, alkyl groups, alkenyl groups; alkoy groups; aryl groups; and substituted aralkyl and heterocyclic alkyl groups. Some specific examples of carbonylic starting compounds are, formaldehyde, acetaldehyde, acetone, dimethylketene, acetophenone, acrolein, crotonaldehyde, aromatic aldehydes, acid halides, aliphatic esters and haloketones.

It will be appreciated that the physical characteristics and chemical properties of the copolymers of this invention depend on the R and R' substituents, the molecular weight of the copolymer and the ratio between the number of ester groups

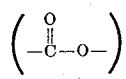

and the sum of the ester and acetal

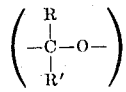

groups. For convenience this ratio will be referred to hereinafter as "r." It follows therefore that the infrared spectrum of the various copolymers of this class will vary according to the varying "r" value.

The solubility of the copolymers having the same "r" value varies according to the molecular weight of the polymer, hence a mixture of these polymers may be simply separated by conventional, successive, solvent extraction techniques to provide polymers of uniform properties.

Broadly, the process of this invention comprises reacting a carbonylic group containing organic compound or polymer thereof with carbon monoxide in the presence of a catalyst selected from the group of cationic halogenated derivatives of an element selected from groups III, IV, V, and VIII of the Periodic Table at a temperature within the range of about $-110°$ C and $250°$ C and under a pressure in excess of about 29 Atm.

As mentioned above the catalysts used in our method of preparing the novel copolymers of the present invention are ionic in nature and more precisely, cationic. Catalysts, meeting the requirements of our process, are halogenated derivatives of elements selected from groups III, IV, V, and VIII, of the Periodic Table of Elements. By way of example of catalysts useful in the process of this invention are $BF_3$, and complexes thereof with oxygenated, sulfurated or nitrogenous compounds, especially ethers and tertiary amines, $BCl_3$, $AlCl_3$, $TiCl_4$, $TiCl_3$, $ZrCl_4$, $VCl_3$, $VOCl_3$, $VCl_4$, $FeCl_3$, $PdCl_2$, $PtCl_4$, $SiCl_4$, halogenated-alkylsilanes, $SnCl_4$ and $PdCl_4$. In the preferred embodiment the catalyst utilized is selected from the group of $BF_3$ either alone or in the form of a complex with ethyl ether, trimethylamine, dimethylaniline or N-acetyl-caprolactam; $AlCl_3$, $TiCl_4$, $VCl_3$, $FeCl_3$, and $SnCl_4$. While the amount of catalyst used in the process of this invention may be varied, in the preferred embodiment the catalyst is used in an amount such that the molar ratio of catalyst to carbonyl compound starting material is in the range of about $10^{-1}$ to $10^{-6}$.

While it is not essential, it is often desirable to provide a solvent or suspending agent for one or both of the starting materials, i.e., carbon monoxide and an organic carbonyl compound. As solvents and/or suspending agents we have found suitable any of the numerous readily available aliphatic, cyclo-aliphatic and aromatic hydrocarbons and halogenated hydrocarbons such as petroleum ether, n-pentane, n-heptane, cyclo-hexane, benzene, toluene, methylene chloride, chloroform, carbon tetrachloride and tri-chloro-ethylene.

For illustrative purpose only, the following discussion will be based on the preparation of novel copolymers of carbon monoxide and formaldehyde falling within the scope of the present invention. In accordance with the generic concepts of the invention discussed hereinabove, the structure of the copolymers of carbon monoxide with formaldehyde may be illustrated by the following general formula:

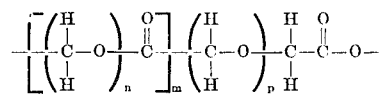

where $n$, $m$ and $p$ all represent whole numbers greater than zero. It is to be clearly understood that the above illustration is not to be considered as a limitation of the scope of this invention but merely by way of illustrating the theory of copolymer formation envolved in the instant invention.

From analytical data it has been theorized that the structural units of the copolymer may be considered as being derived from a sequence of formaldehyde molecules linked one to another and containing carbon monoxide groups at more or less regular intervals. In support of this theory of polymerization, treatment of the carbon monoxide-formaldehyde copolymers with anhydrous liquid ammonia or alcoholic solution thereof at room temperature, results in complete degradation of the polymer, obtaining thereby the amide of glycolic acid, the diamide of diglycolic acid and hexamethylene tetramine.

It will, therefore, be understood by those skilled in the art that the forgoing formula is intended to take into account the simultaneous presence of both types of generic structural units described hereinbefore.

As mentioned, the ratio between the number of ester groups and the sum of the number of ester groups and acetal groups in the main chain, aside from any side-chains which may be formed, will be, for the sake of brevity, referred to as the "r" value. The "r" value, which can be deduced from analysis of the elements in the copolymer, may vary and assume any value less than or equal to 1, but in the usual instance it lies between about 0.056 and 0.97.

Variations of the "r" value, which is to all practical extent, due to variations in the ratio between the carbon monoxide molecules and those of formaldehyde in the copolymer, it was discovered, resulted in a variation of the physical appearance and properties of the copolymer ranging from oily-waxy to solid crystalline. The infrared spectrum of the various copolymers will also vary in accordance with changes in the "r" value.

By way of example, reference is made to

FIG. 1, wherein is shown the infra-red spectrum of a copolymer having the elementary analysis: C = 41 percent, H = 4.4 percent and an "r" value = 0.72.

The infra-red spectrum shows sbsorption bands with peaks at 5.7 microns (ester-carbonyl group), 7 microns (methylene group adjacent to a carbonyl) and a progression of bands between 8 and 9.5 microns due to the C-O-C bond.

Figure 2:
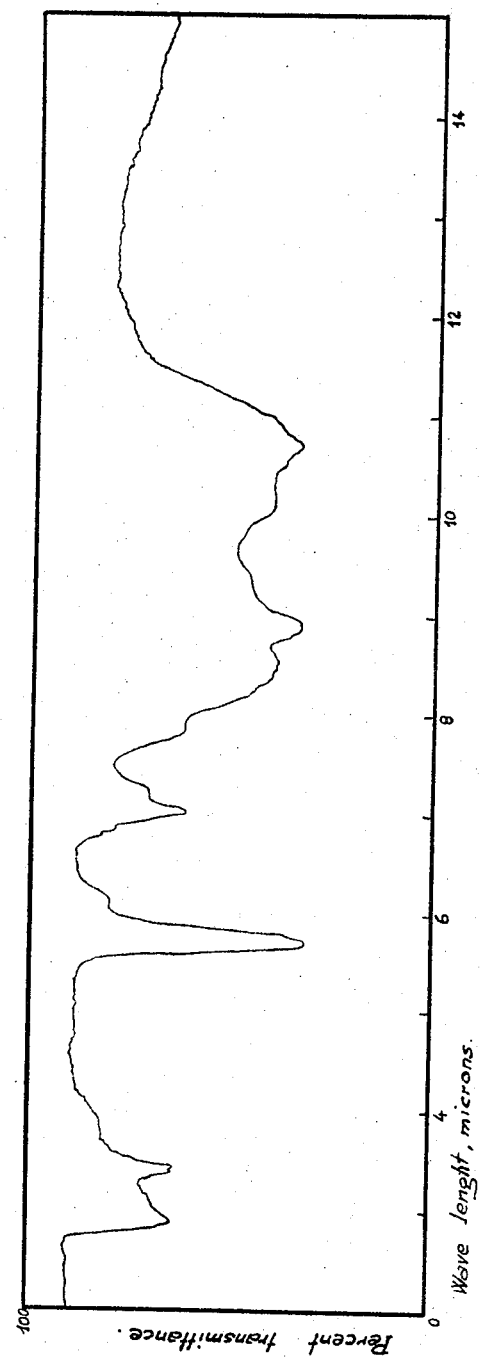

In FIG. 2 is shown the infrared spectrum of samples having an intermediate "r" value and shows, apart from bands with maximum at 5.7 microns and 7 microns, some wide bands between 7.75 and 11.25 microns.

Figure 3:
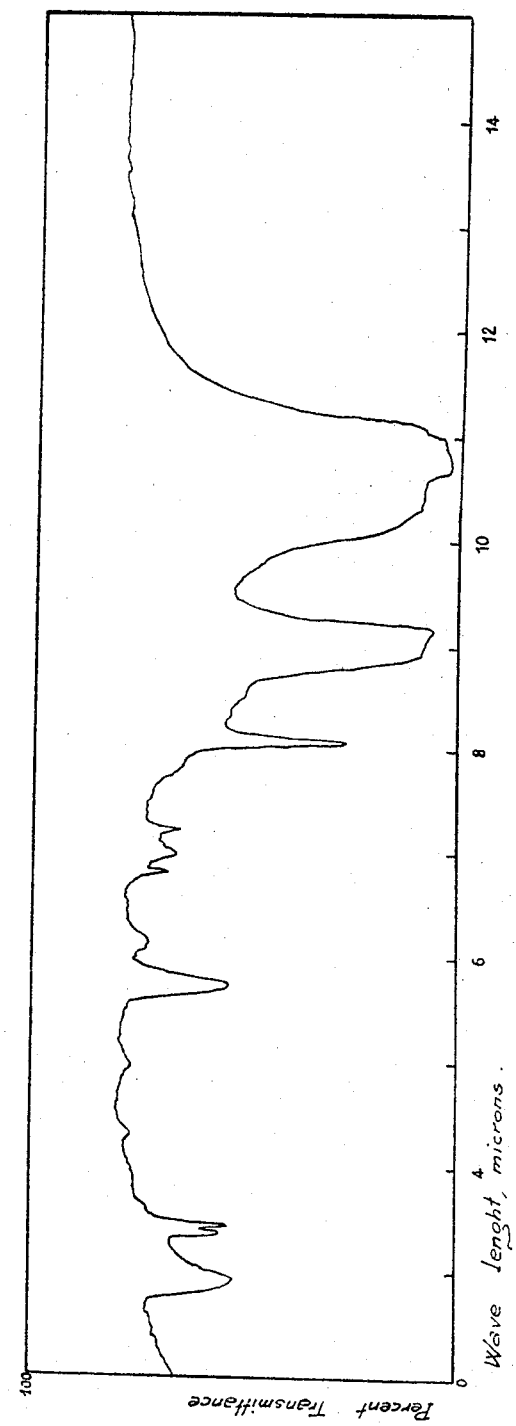

As may be seen in FIG. 3, the infrared spectrum of samples possessing a low "r" value shows, besides bands at 5.7 microns, other bands at 8.7 microns, at approximately 9 microns and at approximately 10.75 microns.

The above illustrated infra-red determinations were carried out on potassium bromide tablets containing 1 percent of the copolymer, using a Perkin-Elmer model 21 spectrophotometer and sodium light, for the 2–15 micron region.

Also, as discussed hereinbefore, the properties of the copolymers of the invention vary as a function of the molecular weight. If, for example, one of the copolymers characterized by a high "r" value, i.e., 0.75, is fractionated by successive extractions with boiling ether, acetone and dioxane, the following fractions are obtained:

| | |
|---|---|
| 1st fraction (soluble in boiling ether) | = 2–3% |
| 2nd fraction (soluble in boiling acetone) | = 50% |
| 3rd fraction (soluble in boiling dioxane) | = 20% |
| 4th residual fraction | = 27–28% |
| Total: | 100 |

The copolymer fraction soluble in ether is found to be an oily product having a molecular weight less than 500. The copolymer fraction soluble in acetone is a low-melting solid, having a molecular weight of the order of 1,000, while the copolymer fraction soluble in dioxane is a solid product having molecular weight above 5,000. The residual copolymer fraction is a crystalline solid having molecular weight higher than 10,000.

Figure 4:
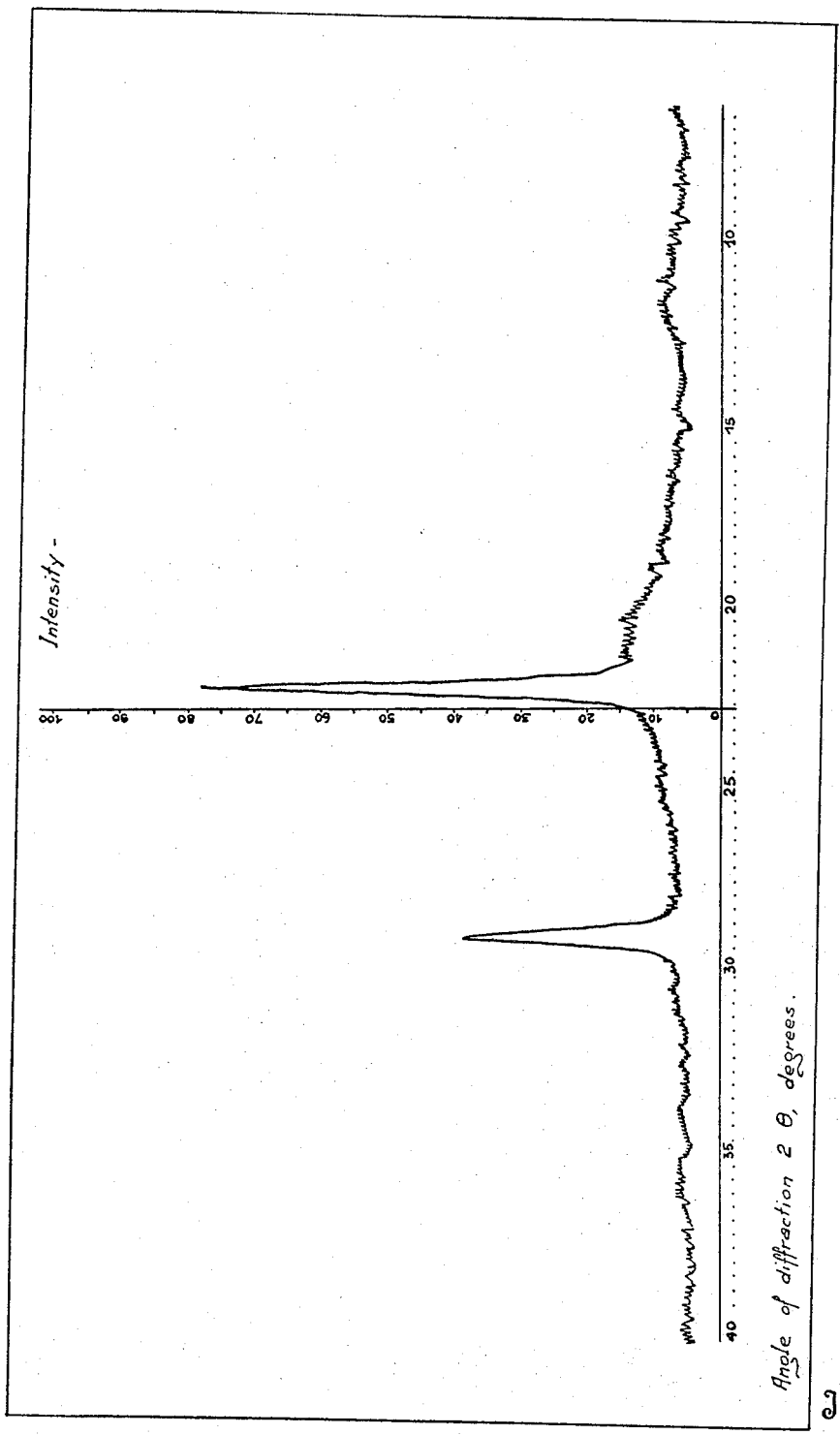

The fractions soluble in acetone, dioxane, and the residual fraction of a copolymer mixture having an "r" value of about 0.75 when submitted to X-ray examination, show photograms resembling one another with two main maximum defraction peaks at $2\theta = 22°$, 25/100 and 29°, 10/100, from which the following reticular distances can be deduced.
1. 3.99 A
2. 3.07 A Referring to FIG. 4 it may be seen that these fractions manifest an amorphous maximum at an angular position of approximately $2\theta = 21°$.

Determinations were carried out using a Geiger counter defractometer, (Philips Gloeil-lampenfabriken) (Eindhoven), in the following experimental conditions:

rad. Cu $(K_\alpha)$ 36 $K_V$ 18 mA

Exploration Speed $\omega = 1°$/minute

Samples of copolymers with different "r" values if submitted to analogous solvent fractionation, are subdivided into fractions of different molecular weight, according to the value of the "r" ratio.

In fact, for instance, one of the copolymers presenting the following element analysis: C = 40.2 percent, H = 6.1 percent, and with a resulting value of "r" = 0.2, when submitted to successive extractions with boiling ether, acetone and dioxane, was subdivided into the following fractions:

| | |
|---|---|
| 1st fraction (soluble in boiling ether) | 2% |
| 2nd fraction (soluble in boiling acetone) | 9% |
| 3rd fraction (soluble in boiling dioxane) | 7% |
| 4th residual fraction | 82% |
| | Total: 100 |

The copolymer fraction soluble in ether is found to be an oily product; the copolymer fraction, soluble in acetone, is a waxy solid; the copolymer fraction soluble in dioxane is a solid product having a molecular weight of the order of 2,000; the residual copolymer fraction is a crystalline, solid having a molecular weight higher than 20,000.

Copolymers distinguished by different "r" values therefore present solubilities depending on the molecular weight and on the "r" ratio; they are partially soluble in methanol, acetone and dioxane, while they are practically insoluble in paraffin hydrocarbons.

For all the copolymers forming the object of the present invention the chemicophysical and mechanical properties therefore depend on the "r" value as defined above and on the molecular weight of the copolymer.

The present invention therefore makes available a wide range of products the chemicophysical and mechanical properties of which vary within wide intervals, thus permitting their application in the most varied fields.

The copolymers forming the object of the present invention are useful products in the fields of molding powders, extrusion materials, films, vulcanizable products, elastomers, adhesives and paints.

The techniques and the conditions under which copolymerization is carried out are, to a certain extent dependant upon the chemicophysical properties of the carbonyl compound used as the starting material, for example, where polymeric formaldehyde is used as the starting material, it is necessary to operate under conditions such that depolymerization with consequent unwinding of the monomers occurs, i.e., under controlled temperature conditions in the presence of an ionic depolymerization catalyst and possibily in the presence of a suitable solvent.

Because formaldehyde monomer is somewhat difficult to handle it has been found to be advantageous, when using the monomer as a starting material, to transfer to the reactor formaldehyde obtained separately, by means of thermal depolymerization, possibily carried out in the presence of suitable depolymerization catalysts.

It has been found desirable, dependent upon the physical properties of the carbonyl compound starting material, but not essential, to use a solvent or suspending agent for one or both of the reactants and the copolymer formed thereby. The use of a solvent in some instances facilitates the copolymerization.

As discussed in detail hereinabove, the novel copolymers obtained in the process of this invention may be separated from the reaction mixture by any conventional means, for example, filtration. Where desired successive solvent extractions utilizing different solvents may be used to separate the copolymer into fractions of varying molecular weight ranges, e.g., boiling ether, acetone and dioxane in that order.

The following examples are illustrative of the process of this invention and the novel class of copolymers obtained thereby and are not intended to be limiting of the scope of this invention:

EXAMPLE 1

10 g trioxane obtained by crystallizing from methylene chloride 1,3,5 trioxane were introduced under a nitrogen atmosphere into a 110 cc stainless steel autoclave provided with manometer, thermocouple, heatin oil-bath and a shaking system. A vacuum was rapidly created in the autoclave until a residual pressure of about 5 mm Hg was reached and 10 cc of boron trifluoride were introduced, and then as much carbon monoxide was added as to reach a pressure of 200 Kg/cm². Temperature was kept at 150° C for 1 hr and 30' while pressure was maintained constantly at 250 Kg/cm² and further quantities of carbon monoxide were introduced by means of a compressor.

After cooling and after elimination of the exceeding gas 15 g of a solid whitish product were withdrawn.

The analysis revealed the following percentage composition:

$C\% = 41,0$
$H\% = 4,4$

Subjected to extraction in a Kumagawa type extractor, it showed a solubility in boiling ether of 2–3 percent, in boiling acetone of about 50 percent, in boiling dioxane of 90 percent.

The ether soluble fraction consisted of an oily product of a molecular weight lower than 500 (determined by ebullioscopy).

The acetone soluble fraction was solid, low melting, with a molecular weight in the order of a thousand.

The dioxane soluble fraction showed a molecular weight of 4.500.

Infrared rays analysis showed that the three fractions were formed by oxyester-acetal linkages.

EXAMPLE 2

Proceeding in the same was as described in example 1,except for the use of a 250 cc. autoclave, 50 g of 1,3,5 trioxane were introduced into the autoclave under a nitrogen atmosphere and after having rapidly created a vacuum, 20 cc of boron trifluoride and as much carbon monoxide were added as to reach a pressure of 200 Kg/cm². The autoclave was then heated to 200° C. maintaining the pressure constantly at 300 Kg/cm² by the continuous introduction of carbon monoxide.

After 1 hr it was cooled, the exceeding gas was eliminated and 80 g of a light brown product were withdrawn which, when analyzed, exhibited substantially the same properties as those obtained by the forgoing example. After subjecting this product to extraction in a Kumagawa-type extractor, successively, in boling ether, acetone, dioxane, an insoluble residuum was left which showed an infrared spectrum analogous to that of a polyester of the glycolic acid.

The soluble fractions consisted of formaldehyde-carbon monoxide copolymers with different molecular composition.

EXAMPLE 3

Into the same equipment as that described in example 1, 10 g of 1,3,5 trioxane were introduced under a nitrogen atmosphere, and after vacuum has been made, 15 cc of boron trifluoride were added.

Pressure was then brought up to 100 Kg/cm² by introducing carbon monoxide. Heating was started and the autoclave was kept at 100° C for 3 hrs. The pressure, after having reached 120 Kg/cm², decreased and settled at 80 Kg/cm². After cooling and after eliminating the exceeding gas, 14.7 g of a waxy product were extracted, which were then subjected to infrared rays analysis and showed a structure of the oxyester-acetalic type.

EXAMPLE 4

While operating as in example 2, 20 g of 1,3,5 trioxane and 15 cc of BF₃ were introduced in a 250 cc autoclave.

As much carbon monoxide was then introduced in the autoclave as to reach a pressure of 230 Kg/cm². The autoclave was kept at a temperature of 70° C for 2 hrs while pressure was maintained at 230 Kg/cm² by the continuous introduction of carbon monoxide.

28,8 g of a waxy product were obtained and then extracted in a Kumagawa-type extractor with acetone. The infrared analysis of the extract and of the residuum showed that in both cases it was a carbon monoxide-formaldehyde copolymer and that the ratio of CO/CH₂O was higher for the soluble fraction.

EXAMPLE 5

500 g of para-formaldehyde were introduced into a 1,000 cc stainless steel autoclave provided with shaking system, manometer, thermocouple and air heated furnace. After a vacuum was created in the autoclave until a residual pressure of 10 mm Hg was reached, 100 cc of boron-trifluoride were introduced and as much carbon monoxide was added as to reach a pressure of 150 Kg/cm².

The autoclave was kept at 150° C for 2 hours while the pressure was maintained constantly at 225 Kg/cm² by introducing further quantities of carbon monoxide.

The product obtained was extracted in a Kumagawa-type extractor with ether and acetone. The infrared analysis, effected on the various fractions, showed that in all cases they were CO/CH₂O copolymers in which the ratio between the comonomers decreased while passing from the ethereal extract to the acetonic extract and to the residuum.

EXAMPLE 6

Into the same equipment as that described in example 2, 200 cc of sodium-distilled n-heptane and 10 g of 1,3,5 trioxane were introduced under a nitrogen atmosphere. Vacuum was then rapidly created (until a residual pressure given by the vapor tension of the solvent was reached) and 15 cc of boron-trifluoride were introduced, as much carbon monoxide is then introduced as necessary to reach a pressure of 230 Kg/cm². The autoclave was heated at 100° C while maintaining the pressure at 250 Kg/cm² by introducing further quantities of carbon monoxide.

After 2 hrs the autoclave was cooled and the excess gases discharged. A suspension was obtained from which the polymer was isolated by filtration. After removal of the solvent under vacuum the polymer was examined by infrared analysis showing it to be a CH₂O/CO copolymer.

EXAMPLE 7

Into the same equipment as that described in example 1 , 10 g of 1,3,5 trioxane and 0.3 g of anhydrous AlCl₃ were introduced under a nitrogen atmosphere and after rapidly creating a vacuum in the autoclave, as much carbon monoxide was then introduced as to reach a pressure of 200 Kg/cm².

The autoclave was then heated at a temperature of 100° C while maintaining the pressure at 250 Kg/cm² by introducing further quantities of carbon monoxide.

After 5 hrs it was cooled and the excess gas discharged. The product obtained was treated with diluted hydrochloric acid in order to remove completely the catalyst, then with water and finally with methanol.

The polymer was extracted in a Kumagawa-type extractor with acetone and the fractions obtained were subjected to infrared analysis. Both the residuum and the soluble fraction showed bands which are characteristic of carbon monoxide / formaldehyde copolymers.

EXAMPLE 8

Into the same equipment used in example 2, 25 g of 1,3,5 trioxane and 1 cc of boron-trifluoride etherate ($F_3B \cdot OEt_2$) were introduced under atmosphere nitrogen.

The autoclave was rapidly evacuated and carbon monoxide introduced to a pressure of 200 Kg/cm². The autoclave was heated to a temperature of 100° C while maintaining the pressure at 250 Kg/cm² by introducing further quantities of carbon monoxide.

After 2 hrs the reaction mixture was cooled and the excess gas discharged. The product obtained was subjected to infrared analysis which showed the product to be a carbon monoxide/formaldehyde copolymer.

EXAMPLE 9

Into the same equipment as that described in example 2, 20 g of 1,3,5, trioxane and 30 cc of trichloroethylene were introduced under a nitrogen atmosphere.

A vacuum was rapidly formed in the autoclave (until a residual pressure given by the vapor tension of the solvent was reached) and 1 cc of boron-fluoride etherate was introduced followed by the introduction of as much carbon monoxide as to reach a pressure of 200 Kg/cm². The autoclave was then heated at 150° C while pressure was maintained at 270 Kg/cm² by introducing further quantities of carbon monoxide by means of a compressor.

After 1 hr it was cooled and the excess gas eliminated. The product was filtered and subjected to infrared analysis, which showed the product to be a formaldehyde-carbon monoxide copolymer.

EXAMPLE 10

Into the same equipment as that described in example 2, 20 g of 1,3,5 trioxane were introduced under a nitrogen atmosphere; after formation of a vacuum, 10 cc of boron-trifluoride were added.

The pressure was then brought to 25 Kg/cm² by introducing carbon monoxide.

The autoclave was then heated at 100° C while pressure was maintained at 30 Kg/cm² by introducing further quantities of carbon monoxide.

After 4 hrs the autoclave was cooled and the excess gas exhausted. The obtained product was subjected to infrared analysis which gave an analysis of a $CH_2O/CO$ copolymer.

EXAMPLE 11

Into the same equipment as that described in example 1, g 10 of 1,3,5 trioxane and 0.2 g of $VCl_3$ were introduced under a nitrogen atmosphere and, after having rapidly formed a vacuum, the pressure was brought up to 200 Kg/cm² by introducing carbon monoxide. The autoclave was then heated at 100° C, while pressure was maintained constantly at 270 Kg/cm² the introduction of further quantities of carbon monoxide.

After 1 hr the autoclave was cooled and the excess gas eliminated. The product obtained was washed by employing in the order, diluted hydrochloric acid, water, methanol. It was then subjected to infrared analysis which gave an analysis of $CH_2O/CO$ copolymer.

EXAMPLE 12

Into the same equipment as that described in example 1, 10 g of 1,3,5 trioxane were introduced under a nitrogen atmosphere and, after having rapidly created the vacuum, 0,5 cc of $SnCl_4$ were introduced and then as much carbon monoxide was added to a pressure of 200 Kg/cm².

The autoclave was heated at 100° C while pressure was maintained constantly at 250 kg/cm² by introducing further quantities of carbon monoxide.

After 1 hr the autoclave was cooled and the excess gas was eliminated. The product obtained was washed first with dilute hydrochloric acid, then with water and, finally, with methanol. The product obtained was subjected to infrared analysis and resulted to be a $CH_2O/CO$ copolymer.

EXAMPLE 13

Into the same equipment as that described in example 1, 10 g of 1,3,5 trioxane were introduced under a nitrogen atmosphere and, after having rapidly created the vacuum, 0,5 cc of $TiCl_4$ were introduced and then as much carbon monoxide was added as to reach a pressure of 200 Kg/cm².

It was heated at 100° C while pressure was maintained constantly at 250 Kg/cm² by introducing further quantities of carbon monoxide.

After 1 hr the autoclave was cooled and the excess gas eliminated. The product obtained was washed, first with diluted hydrochloric acid, then with water and finally with methanol.

The product, subjected to infrared analysis, was analyzed as a $CH_2O/CO$ copolymer.

EXAMPLE 14

Into the same equipment as that described in example 2, 10 g of 1,3,5 trioxane were introduced under a nitrogen atmosphere and, after a vacuum was rapidly created, 0,5 g of $FeCl_3$ were introduced and then as much carbon monoxide was added as necessary to reach a pressure of 210 Kg/cm².

The autoclave was heated at 100° C, while the pressure was maintained constant at 250 Kg/cm² by introducing further quantities of carbon monoxide.

After 2 hrs the autoclave was cooled and the excess gas was eliminated. The product thus obtained was then washed by employing in the order, dilute hydrochloric acid, water and methanol.

The product subjected to infrared rays, turned out to be a $CH_2O/CO$ copolymer.

EXAMPLE 15

Into the same equipment as that described in example 2, 10 g of 1,3,5 trioxane were introduced under a nitrogen atmosphere together with 20 cc of cyclo-hexane.

Vacuum was rapidly created in the autoclave, thereupon, 10 cc of $BF_3$ were introduced and then as much carbon monoxide as necessary to reach a pressure of 220 Kg/cm².

The mixture was heated to 100° C while the pressure was maintained constantly at 270 Kg/cm² introducing further quantities of carbon monoxide.

After 1 hr the autoclave was cooled and the excess gas eliminated. The product obtained was filtered and subjected to infrared analysis : it resulted to be a $CH_2O/CO$ copolymer.

EXAMPLE 16

100 g of 1,3,5 trioxane vaporized at 150° C in carbon monoxide flow and 0,004 moles of $BF_3$ diluted with carbon monoxide were introduced at the same time and in 1 hour time into a 500 cc stainless steel autoclave provided with a manometer, containing carbon monoxide at a pressure of 200 Kg/cm² and maintained at room temperature.

105 gr of a white product were obtained, which was insoluble in boiling acetone and, subjected to infrared analysis resulted to be a $CH_2O/CO$ copolymer.

EXAMPLE 17

400 g of 1,3,5 trioxane were introduced under a nitrogen atmosphere into a 2 liters stainless steel autoclave provided with manometer, thermocouple, heating oil-bath and propeller stirrer. Vacuum was then rapidly made in the autoclave and 300 cc of $BF_3$ were introduced and then as much carbon monoxide was added as to reach a pressure of 250 Kg/cm².

The autoclave was then heated at 110° C, while pressure was maintained constant at 270 Kg/cm² by introducing further quantities of carbon monoxide.

After 5 hrs the autoclave was cooled and the excess gas eliminated, 600 g of an extremely viscous, liquid product were extracted, which, when subjected to infrared analysis, resulted to be a CH$_2$O/CO copolymer.

EXAMPLE 18

420 g of 1,3,5 trioxane were introduced under a nitrogen atmosphere in the same equipment as that described in example 17, and, after having rapidly created the vacuum, 300 cc of BF$_3$ were introduced and then as much carbon monoxide as necessary to reach a pressure of 250 Kg/cm$^2$.

The autoclave was then heated at 110° C and after 5 hrs the temperature was brought up to 180° C while pressure was maintained constant at 270 Kg/cm$^2$ by introducing further quantities of carbon monoxide.

After 3 hrs the autoclave was cooled and the excess gas eliminated. 740 g of a solid product was extracted, which was subjected to extraction with boiling acetone. The insoluble residuum (600 g) was subjected to infrared analysis and resulted to be a formaldehyde/carbon monoxide copolymer. This showed a melting point of 130°–140° C and, subjected to elemental analysis, showed the following percentage composition:

$$C = 41,4\%$$
$$H = 3,6\%$$

Also the acetone soluble fraction was subjected to infrared rays analysis and resulted to be a CH$_2$O/CO copolymer.

EXAMPLE 19

30 g of formaldehyde and 50 cc of BF$_3$ diluted with carbon monoxide were introduced at the same time and within 2 hrs in the same autoclave as that described in example 17 containing carbon monoxide at a pressure of 200 Kg/cm$^2$ and maintained at 100° C. The formaldehyde was obtained by depolymerizing separately alpha-polyoxymethylene by thermal decomposition at 175° C in 100 cc stainless steel autoclave directly connected to the polymerization autoclave.

40 g of product was thus obtained, which, subjected to infrared rays analysis turned out to be a CO/CH$_2$O copolymer.

EXAMPLE 20

64 g of trioxane vaporized separately in a carbon monoxide stream were introduced within 2 hrs in the equipment described in example 17, and containing 700 cc heptane distilled on lithium-aluminum hydride, 1 cc boron-trifluoride-lithium diethyletherate and carbon monoxide at a pressure of 200 Kg/cm$^2$.

90 g of a product were obtained, which, subjected to infrared rays analysis turned out to be a CO/CH$_2$O copolymer.

EXAMPLE 21

While employing the equipment described in example 2, 20 g of 1,3,5 trioxane and 0,1 g of the complex boron-trifluoride trimethylamine (BF$_3$·N(CH$_3$)$_3$) were introduced under a nitrogen atmosphere. A vacuum was then rapidly created. As much carbon monoxide was then introduced as necessary to reach a pressure of 100 Kg/cm$^2$.

The autoclave was then heated at 160° C while maintaining the pressure constantly at 200 Kg/cm$^2$ with the introduction of further quantities of carbon monoxide.

After 2 hrs the autoclave was cooled and the excess gas eliminated. The product was washed with acetone, filtered and dried under vacuum.

Subjected to infrared analysis it resulted to be a carbon monoxide-formaldehyde copolymer.

EXAMPLE 22

In the autoclave described in example 2, 20 g of 1,3,5 trioxane and 0.1 g of the complex boron-trifluoride-dimethylaniline (BF$_3$·C$_6$H$_5$N(CH$_3$)$_2$) were introduced under a nitrogen atmosphere. A vacuum was rapidly created and as much carbon monoxide was introduced as necessary to reach a pressure of 100 Kg/cm$^2$.

The autoclave was heated at 130° C while pressure was maintained constantly at 200 Kg/cm$^2$ with the introduction of further quantities of carbon monoxide.

After 2 hrs the autoclave was cooled and the excess gas was eliminated. The product obtained was washed with acetone, filtered and dried under vacuum.

Subjected to infrared rays analysis it resulted to be a carbon monoxide-formaldehyde copolymer.

EXAMPLE 23

While employing the equipment described in example 2, 20 g of 1,3,5 trioxane and 0.1 g of complex boron-trifluoride-N-acetyl caprolactam

(this complex was obtained by contacting gaseous boron-trifluoride with a petroleum ether N-acetyl-caprolactam solution, washing the precipitate with petroleum ether and drying in vacuum) were introduced under a nitrogen atmosphere. Vacuum was then rapidly made and as much carbon monoxide was introduced as necessary to reach a pressure of 100 Kg/cm$^2$.

The autoclave was heated at 100° C while pressure was maintained constantly at 200 Kg/cm$^2$ with the introduction of further quantities of carbon monoxide.

After 2 hrs the autoclave was cooled and the excess gas was eliminated. The product obtained was washed with acetone filtered and dried under vacuum.

Subjected to infrared rays analysis it was analyzed as a carbon monoxide-formaldehyde copolymer.

EXAMPLE 24

The present example relates to a process for obtaining a copolymer according to the present invention and the successive degradation thereof.

400 g of trioxane, 300 cc of boron-trifluoride and finally as much carbon monoxide as necessary to reach a pressure of 300 kg/cm$^2$ were introduced into a 2 liters stainless steel autoclave provided with propeller stirrer and jacket heating with oil circulation. The autoclave was heated to 110° C and after 4 hrs it was cooled and the reaction mass discharged.

The product thus obtained was like a pasty mass which had a high viscosity, yellow coloration and contained in suspension a small quantity of polyoxymethylene. By means of the mass balance it was possible to calculate the composition as 1,4 moles of formaldehyde for 1 mole of carbon monoxide.

The raw product thusly obtained was then distilled under vacuum at 110° C for about 5 hrs.

The distillate (about 10 percent) was subjected to infrared rays analysis, which showed the product to be primarily composed of formaldehyde and low molecular weight derivatives of glycolic acid.

The residuum was a solid product, which was slightly more colored than the initial product, transparent and frail having a softening point of about 40° C. The infrared spectrum of the so treated product was substantially the same as that of the untreated product.

The close similarity of these spectrum indicate that vacuum distillation merely eliminates the shortest and loosely bonded chains.

The product thus obtained (30 g) was then subjected to degradation while suspending it in absolute ethyl alcohol (250 cc) and bubbling anhydrous ammonia through the suspension for 8 hrs at room temperature. After reacting the mixture an additional 15 hrs, the alcohol was removed by vacuum distillation.

The residuum was extracted twice with 200 cc boiling chloroform and 2 g of product were obtained, which, after further purification, was principally composed of hexamethylene-tetramine.

The portion not extracted by chloroform was dissolved in boling ethyl alcohol and from this solution, by means of successive crystallizations, the amide of glycolic acid and the diamide of diglycolic acid were isolated and identified through their melting point and the infrared spectrum.

EXAMPLE 25

100 g of 1,3,5 trioxane were introduced at room temperature into a 250 cc oscillating autoclave provided with manometer, thermocouple and heating oil-bath.

A vacuum was rapidly formed and 20 cc of gaseous boron-trifluoride were introduced by suction and then as much carbon monoxide as necessary was introduced to reach a pressure of 200 Kg/cm².

Shaking in the autoclave was started and the temperature was brought to 100° C. The pressure of the carbon monoxide was maintained constantly at 300 atm. while continuously introducing carbon monoxide.

After 1 hr heating and shaking was interrupted and the autoclave cooled. 130 g of a whitish polymer were obtained which was subjected to extraction in a Kumagawa-type extractor employing as extraction solvents ether, acetone and dioxane in that order.

Infrared and X-rays analysis were effected on the individual fractions and on the residuum. Analysis confirmed that the fractions were carbon monoxide / formaldehyde copolymers. In addition the infrared spectra effected on the individual fractions were very similar one another.

The molecular weights calculated on the various fractions had the following values:

| | |
|---|---|
| 1° fraction (ether soluble) | 2–3% oily product - molecular weight about 450. |
| 2° fraction (acetone soluble) | 15% low melting product - molecular weight about 900. |
| 3° fraction (dioxane soluble) | 12% solid product with a softening point higher than 100° C - molecular weight about 4500. |
| 4° fraction (residuum) | 70–71% solid product with a softening point higher than 150° C - molecular weight about 12.500. |

We claim:

1. Copolymers of carbon monoxide and an organic carbonylic compound selected from the group consisting of formaldehyde monomer, linear polymers thereof and trioxane having all of the groups

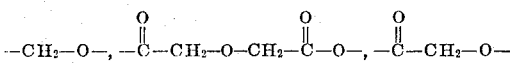

and formed by reacting said carbon monoxide directly with said organic compound in the presence of a catalyst selected from the group of cationic chlorinated and fluorinated derivatives of an element selected from the groups III, IV, V and VIII of the Periodic Table, at a temperature between about −110° C and +250° C under a pressure of about 30 to 5,000 atm, said copolymers having ester and acetal groups with the ratio of the number of ester groups to the sum of the numbers of ester and acetal groups ranging from 0.056 to 0.97.

2. Copolymers of carbon monoxide and formaldehyde formed by direct reaction under anhydrous conditions of carbon monoxide and formaldehyde in the presence of a catalyst selected from the group of cationic chlorinated and fluorinated derivatives of an element selected from the groups III, IV, V and VIII of the Periodic Table, at a temperature between about −110° C and +250° C under a pressure of about 30 to 5,000 Atm., consisting essentially of all of the structural units:

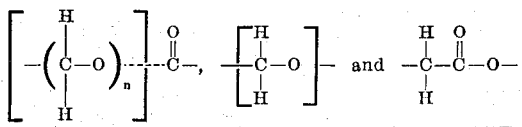

in a random distribution and as represented by the formula:

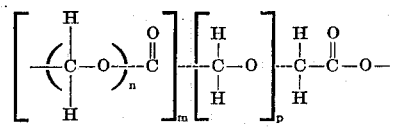

wherein $n$, $m$ and $p$ are whole numbers $>0$.

3. Copolymers as defined in claim 2, in which the ratio of the number of ester groups to the sum of the numbers of ester and acetal groups in the main chain of the copolymer is comprised in the range between 0.056 and 0.97.

4. Copolymers as defined in claim 3, formed by carbon monoxide and by an organic compound selected from formaldehyde monomer, linear polymers thereof and trioxane.

5. A process for the copolymerization of carbon monoxide with an organic compound selected from the group consisting of formaldehyde monomer, linear polymers thereof and trioxane, which comprises reacting under anhydrous conditions, carbon monoxide and said organic compound in the presence of a catalyst selected from the group of cationic chlorinated and fluorinated derivatives of an element selected from the groups III, IV, V and VIII of the Periodic Table, at a temperature between about −110° C and +250° C under a pressure of about 30 to 5,000 Atm to produce a polymer consisting essentially of all of the structural units:

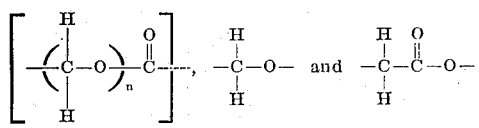

in a random distribution and as represented by the formula:

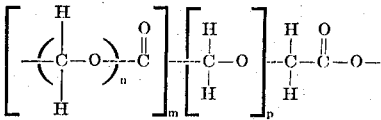

wherein $n$, $m$ and $p$ are whole numbers $>0$.

6. The process defined in claim 5 wherein the catalyst is selected from the group which consists of complexes $BF_3$ with oxygenated, sulphurized or nitrogen containing compounds, $AlCl_3$, $TiCl_4$, $VCl_3$, $FeCl_3$, and $SnCl_4$, the molar ratio of catalyst to said organic compound having a value comprised in the range between $10^{-1}$ and $10^{-6}$, the reaction being carried out at a temperature comprised in the range between 70° C and 200° C in a reaction medium selected from the group consisting of petroleum ether, n-pentane, n-heptane, cyclo-hexane, benzene, toluene, methylene chloride, chloroform, carbon tetrachloride and trichloroethylene.

7. The process defined in claim 6 wherein $BF_3 \cdot O(C_2H_5)_2$, $BF_3 \cdot N(CH_3)_3$, $BF_3 \cdot C_6H_5N(CH_3)_2$, or $BF_3 \cdot N$-acetylcaprolactam is employed as the catalyst.

8. The process defined in claim 7 wherein formaldehyde solutions or suspensions with a formaldehyde concentration higher than about 5 percent are used in the reaction.

9. The process defined in claim 7 wherein formaldehyde obtained by depolymerization of one of the formaldehyde polymer is used in the reaction.

10. The process defined in claim 7, further comprising the step of extracting the polymerization product successively with ether, acetone and dioxane.

* * * * *